(12) United States Patent
Yamauchi

(10) Patent No.: US 8,392,435 B1
(45) Date of Patent: Mar. 5, 2013

(54) QUERY SUGGESTIONS FOR A DOCUMENT BASED ON USER HISTORY

(75) Inventor: Tomoaki Yamauchi, Kamakura (JP)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 12/830,673

(22) Filed: Jul. 6, 2010

Related U.S. Application Data

(60) Provisional application No. 61/324,287, filed on Apr. 14, 2010.

(51) Int. Cl.
*G06F 17/30* (2006.01)
(52) U.S. Cl. .......................... 707/749; 707/768
(58) Field of Classification Search .......... 707/748–751, 707/768, 999.01, 999.003, 999.006, 999.107
See application file for complete search history.

(56) References Cited

U.S. PATENT DOCUMENTS

| | | | |
|---|---|---|---|
| 6,704,729 B1 * | 3/2004 | Klein et al. ............................ 1/1 |
| 7,860,871 B2 * | 12/2010 | Ramer et al. ................... 707/751 |
| 7,908,280 B2 * | 3/2011 | Frank et al. ................... 707/749 |
| 2005/0022114 A1 * | 1/2005 | Shanahan et al. ............. 715/513 |
| 2005/0076003 A1 * | 4/2005 | DuBose et al. .................... 707/1 |
| 2007/0060114 A1 * | 3/2007 | Ramer et al. .................. 455/418 |
| 2007/0192294 A1 * | 8/2007 | Ramer et al. ...................... 707/3 |
| 2010/0057675 A1 * | 3/2010 | White et al. ....................... 707/3 |
| 2010/0153324 A1 * | 6/2010 | Downs et al. ................... 706/21 |
| 2010/0223252 A1 * | 9/2010 | Broman et al. ............... 707/709 |
| 2010/0306249 A1 * | 12/2010 | Hill et al. ....................... 707/769 |
| 2011/0016005 A1 | 1/2011 | Li et al. |
| 2012/0130978 A1 * | 5/2012 | Li et al. ......................... 707/706 |

FOREIGN PATENT DOCUMENTS

WO   2011014979   2/2011

* cited by examiner

*Primary Examiner* — Leslie Wong
(74) *Attorney, Agent, or Firm* — Fish & Richardson P.C.

(57) ABSTRACT

Methods, systems, and apparatus, including computer program products, for presenting search query suggestions. In an aspect, content of a resource that is determined to be responsive to a search query is received, and a candidate set of search query suggestions for the search query is suggested based, in part, on search history data associated with the search query. A final set of search query suggestions based on the search history data and the content of the resource and provided for display on a client device.

14 Claims, 5 Drawing Sheets

QUERY SUGGESTIONS FOR A DOCUMENT BASED ON USER HISTORY

CLAIM OF PRIORITY

This application claims priority under 35 U.S.C. §119(e) to U.S. Patent Application Ser. No. 61/324,287, filed on Apr. 14, 2010, the entire disclosure of which is hereby incorporated by reference.

BACKGROUND

This specification describes technologies relating to search query suggestions.

The Internet provides access to a wide variety of resources, for example, video files, image files, audio files, or Web pages including content for particular subjects, book articles, or news articles. A search system can select one or more resources in response to receiving a search query. A search query is data that a user submits to a search engine to satisfy the user's informational needs. The search queries are usually in the form of text, e.g., one or more query terms. The search system selects and scores resources based on their relevance to the search query and on their importance relative to other resources to provide search results that link to the selected resources. The search results are typically ordered according to the scores and presented according to this order.

Search systems can provide search suggestions to users to help users satisfy their informational needs. For example, in response to a user entering the search query "cricket," a search system may suggest "India South Africa Series" as a query suggestion. As used herein, the term "query suggestion" is a suggested data that can be used to refine a search or refine a search strategy. A query suggestion can be another search query, keywords, or topics to which a search query or keyword belongs. A query suggestion can be used as an additional query, e.g., the query suggestion can be processed by the search system as a query. Alternatively, a query suggestion can be a topic identifier that is used to narrow a search to a specific topic.

SUMMARY

This specification describes technologies relating to generating query suggestions.

In general, one aspect of the subject matter described in this specification can be embodied in methods that include the actions of receiving content of a resource that is determined to be responsive to a search query included in a search request, the search request being associated with a unique identifier of a user device that provided the search request; receiving a candidate set of search query suggestions for the search query, the candidate set of search query suggestions based, in part, on search history data associated with the unique identifier, the search history data including data from and related to previous search requests associated with the unique identifier; for each of the search query suggestions in the candidate set of search query suggestions: determining whether the search query suggestion meets a relevancy criterion that defines the search query suggestion as being relevant to the content of the resource; in response to determining that the search query suggestion meets the relevancy criterion, including the search query suggestion in a final set of search query suggestions; and in response to determining that the search query suggestion does not meet the relevancy criterion, excluding the search query suggestion from the final set of search query suggestions; and providing the final set of search query suggestions for display on the user device. Other embodiments of this aspect include corresponding systems, apparatus, and computer program products.

Another aspect of the subject matter described in this specification can be embodied in methods that include the actions of receiving, at a client device, content of a resource that is determined to be responsive to a search query; generating, by the client device, a candidate set of search query suggestions for the search query, the candidate set of search query suggestions based, in part, on search history data associated with the search query; selecting, by the client device and from the candidate set of search queries, a final set of search query suggestions based on the search history data and the content of the resource; and providing, by the client device, the final set of search query suggestions for display on the client device. Other embodiments of this aspect include corresponding systems, apparatus, and computer program products.

Another aspect of the subject matter described in this specification can be embodied in methods that include the actions of receiving, at one or more server computers, content of a resource that is determined to be responsive to a search query; generating, by the one or more server computers, a candidate set of search query suggestions for the search query, the candidate set of search query suggestions based, in part, on search history data associated with the search query; selecting, by the one or more server computers and from the candidate set of search queries, a final set of search query suggestions based on the search history data and the content of the resource; and providing, by the one or more server computers, the final set of search query suggestions for display on a client device. Other embodiments of this aspect include corresponding systems, apparatus, and computer program products.

Another aspect of the subject matter described in this specification can be embodied in methods that include the actions receiving content of a resource; receiving a candidate set of search query suggestions for a search query included in a search request, the search request being associated with a unique identifier of a user device the proved the search request, the candidate set of search query suggestions based, in part, on search history data associated with the unique identifier, the search history data including data from previous search requests associated with the unique identifier; in response to determining that the resource is a resource provided in response to a selection of a search result that identifies the resource as being responsive to the query, then selecting search query suggestions from the candidate set of search query suggestions and including the selected search query suggestions in a final set of search query suggestions, the selection being independent of the content of the resource; and in response to determining that the resource is a resource that is selected from within N subsequent link selections of a resource provided in response to a selection of a search result that identifies the resource as being responsive to the search query, then for each of the search query suggestions in the candidate set of search query suggestions: determining whether the search query suggestion meets a relevancy criterion that defines the search query suggestion as being relevant to the content of the resource; in response to determining that the search query suggestion meets the relevancy criterion, including the search query suggestion in a final set of search query suggestions; and in response to determining that the search query suggestion does not meet the relevancy criterion, excluding the search query suggestion from the final set of search query suggestions; and providing the final set of search query suggestions for display on the user device. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
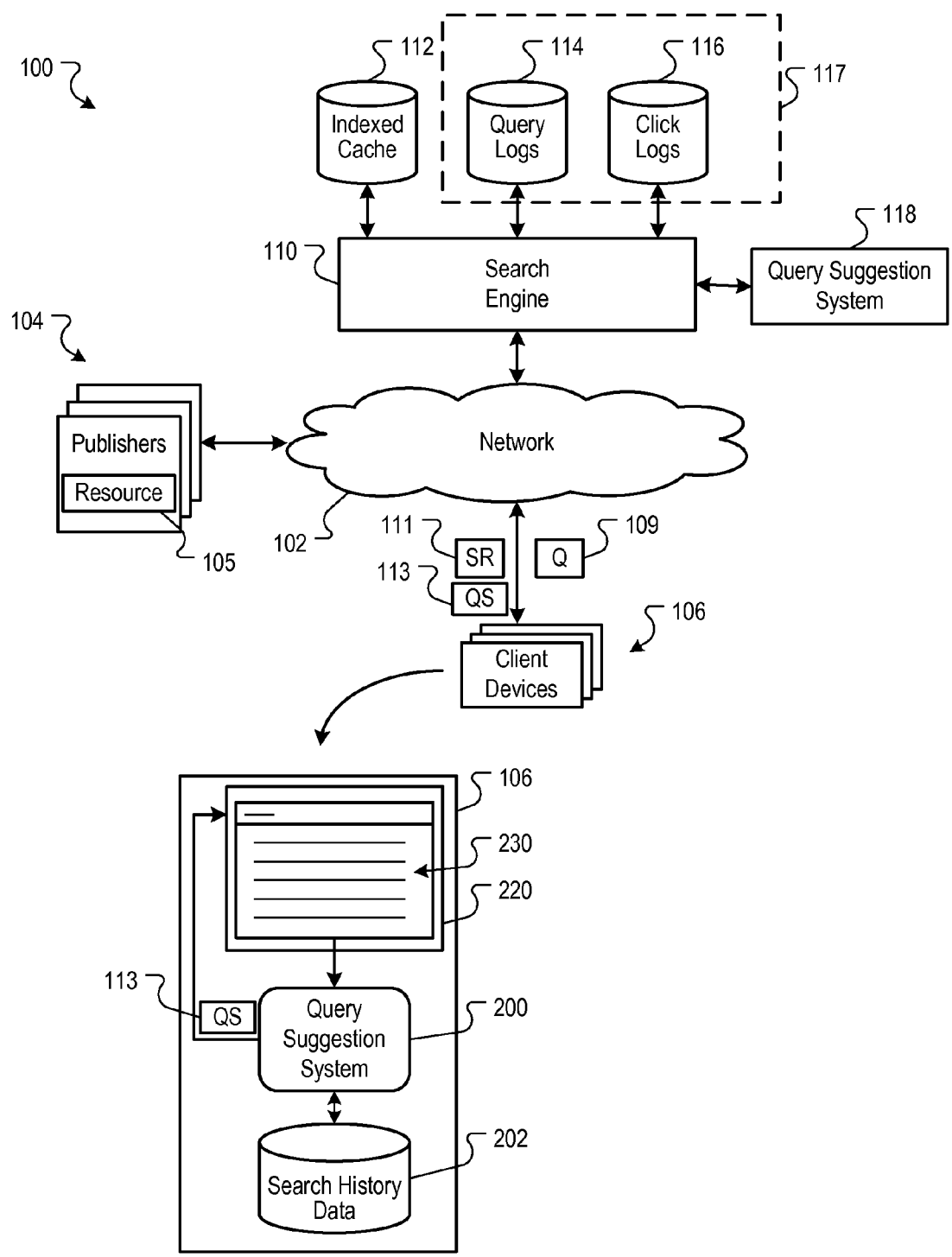
FIG. 1 is a block diagram of an example environment in which a search engine provides search services.

FIG. 1 is a block diagram of an example environment 100 in which a search engine 110 provides search services. A computer network 102, such as a local area network (LAN), wide area network (WAN), the Internet, or a combination thereof, connects publisher web sites 104, client devices 106, and the search engine 110. The online environment 100 may include many thousands of publisher web sites 104 and client devices 106.

A web site 104 is a one or more web page resources 105 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A client device 106 is an electronic device that is under the control of a user and is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the publisher web sites 104 and indexing the resources provided by the publisher web sites 104. The indexed and, optionally, cached copies of the resources are stored in an indexed cache 112.

The client devices 106 submit search queries 109 to the search engine 110. A search queries are submitted in the form of a search request that includes the search request and, optionally, a unique identifier that identifies the client device 106 that submits the request. The unique identifier can be data from a cookie stored at the client device, or a user account identifier if the user maintains an account with the search engine 110, or some other identifier that identifies the client device 106 or the user using the client device.

In response to the search request, the search engine 110 uses the indexed cache 112 to identify resources that are relevant to the queries. The search engine 110 identifies the resources in the form of search results 111 and returns the search results to the client devices 106 in search results pages. A search result is data generated by the search engine 110 that identifies a resource that satisfies a particular search query, and includes a resource locator for the resource. An example search result can include a web page title, a snippet of text extracted from the web page, and the URL of the web page.

The search results are ranked based on scores related to the resources identified by the search results, such as information retrieval ("IR") scores, and optionally a separate ranking of each resource relative to other resources (e.g., an authority score). In some implementations, the IR scores are computed from dot products of feature vectors corresponding to a query and a resource, and the ranking of the search results is based on relevance scores that are a combination of the IR scores and authority scores. The search results are ordered according to these scores and provided to the client device according to the order.

The client devices 106 receive the search results pages and render the pages for presentation to users. In response to the user selecting a search result at a client device 106, the client device 106 requests the resource identified by the resource locator included in the selected search result. The publisher of the web site 104 hosting the resource receives the request for the resource from the client device 106 and provides the resource to the requesting client device 106.

In some implementations, the queries 109 submitted from client devices 106 are stored in query logs 114. Click data for the queries and the web pages referenced by the search results are stored in click logs 116. The query logs 114 and the click data 116 define search history data 117 that include data from and related to previous search requests associated with unique identifiers. The click data define actions taken responsive to search results provided by the search engine 110. The query logs 114 and click logs 116 can be used to map queries submitted by the client devices to web pages that were identified in search results and the actions taken by users (i.e., that data are associated with the identifiers from the search requests so that a search history for each identifier can be accessed). If time data are also stored, then the relative times at which those actions were taken and when the queries were submitted can also be determined. The click logs 116 and query logs 114 can thus be used by the search engine to the sequence of queries submitted by the client devices, the actions taken in response to the queries, and how often the queries are submitted.

Other data can also be included in the search history data 117. For example, the search engine 110 or the query suggestion system 118 can, for a given query and given user identifier, process search results to extract data to store in the search history data. Examples of such extracted data include domain names from the search results, non-stop word text from the snippets, or, alternatively, from the resources that are referenced by the search results. Data such as topics to which the previous search queries belong can also be included. For example, if a user is submitting queries related to the topic of basketball, the topics of sports and basketball can be included in the history data. Various topic identification techniques can be used.

In some implementations, in addition to providing search results in response to queries, the search engine 110, by use of a query suggestion system 118, provides query suggestions that are related to a resource requested by the user device 106 and also related to the search history associated with the identifier that identifies the user device. The query suggestion system 118 accesses the historical data 117 and generates query suggestions for queries submitted by a client device 106. While query suggestions can be initially provided with a search results page, in a particular implementation the query suggestion system 118 generates query suggestions in response to a user selecting a search result and the resource being provided to the client device 106. For example, the query suggestion system 118 generates a candidate set of search query suggestions for the search query. The candidate set of search query suggestions are based, in part, on search history data 117 associated with the unique identifier of the user device that submitted the search request. For example, the query suggestions can be suggestions based on frequency co-occurrence and query stemming of queries stored in query logs, and then filtered according to the particular search history data 117 associated with the unique identifier.

To illustrate, suppose the search history data 117 indicates a particular user is searching for jobs, and the user enters the query "BigCo", which is the name of an example company. An initial set of query suggestions may include "BigCo computers," "BigCo stock quote," "BigCo options", "BigCo employment," etc. However, using the history data 117, the initial set of query suggestions may be reduced to employment related query suggestions, such as "BigCo jobs," "BigCo job fair," "SmallCo jobs," "BigCo layoffs," etc.

In some implementations, the query suggestions that are generated based, in part, on the history data 117 are a candidate set of query suggestions from which a final set of query suggestions are generated. The final set of query suggestions are queries from the candidate set that are determined to meet a relevancy criterion that defines the search query suggestion as being relevant to the content of the resource that was requested by the client device 106. For example, suppose the user is researching the effect of a recent recession on the job market, and requests a resource from a search result that identifies a news article that describes recent layoffs at BigCo. Each of the candidate query suggestions, i.e., "BigCo jobs," "BigCo job fair," "SmallCo jobs," "BigCo layoffs," are evaluated against the content of the news article to determine if the search query suggestion meets the relevancy criterion. In response to determining that the search query suggestion meets the relevancy criterion, the query suggestion system 118 includes the search query suggestion in a final set of search query suggestions. Conversely, in response to determining that the search query suggestion does not meet the relevancy criterion, excluding the search query suggestion from the final set of search query suggestions. The final set of search query suggestions 113 is then provided to the client device 106 in response to the search request and subsequent selection of the resource.

In some implementations, the relevancy criterion is defined as meeting or exceeding a minimum relevancy measure. The relevancy measure, in some implementations, is a value based on a term frequency function. The term frequency function takes a suggested query as input and determines the frequency of each term of the query (excluding stop words) in the content of a resource. In some implementations, when a query has two or more terms, the term frequency values are evaluated on a central tendency (e.g., averaged by the number of terms) so that queries of different lengths can be scored in a consistent manner. The relevancy measure of the query is then compared to a minimum relevancy measure to determine if the query satisfies the relevancy criterion.

Other relevancy criteria can also be used instead of or in combination with the relevancy criterion described above. For example, the relevancy measures of all queries can first be computed and then normalized to the highest relevancy measure, and the top N scored queries are selected. Alternatively, the queries that both meet the minimum relevancy measure described above and are also a minimum percentage (e.g., 80%) of the of the highest relevancy measure are selected.

In some implementations, the generation of the query suggestions can be implemented on the client device 106 instead of the search engine 110. For example, a particular client device 106 includes query suggestion system 200 is illustrated in additional detail in FIG. 1. The client device 106 includes a query suggestion system 200 and search history data 202. The search history data 202 is similar to the search history data 117, except that the search history data is limited to the history of searches and actions taken at the client device 106. The query suggestion system 200 processes the content 230 of a web page displayed on a display device 220 and the search history data 202 to generate the final set of query suggestions 113. In many respects, the processing that takes place at the client device 106 is similar to the processing that takes place at the search engine 110.

Figure 2:
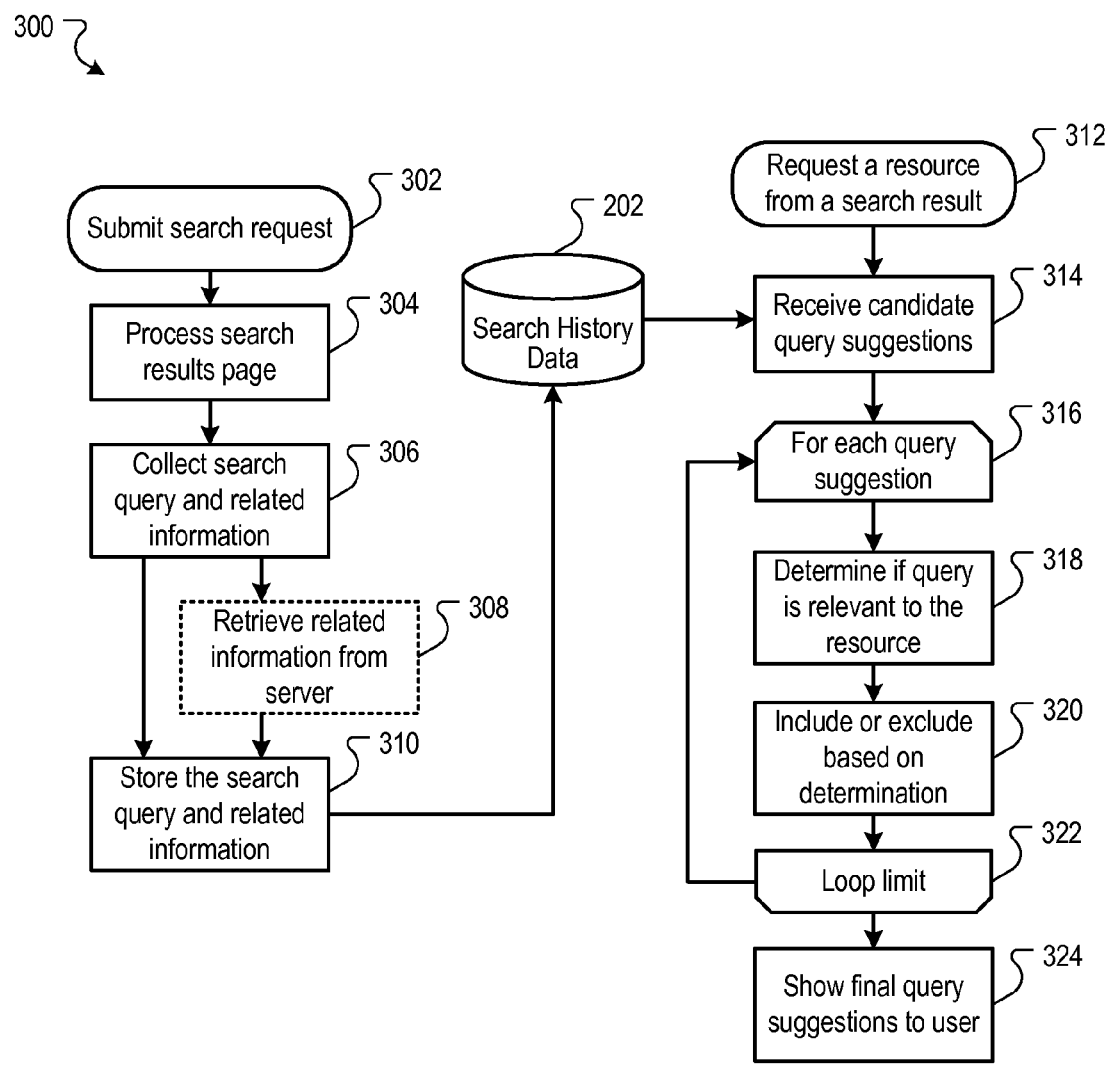
FIG. 2 is a flow diagram of a process that provides search query suggestions at a client device.
Figure 3:
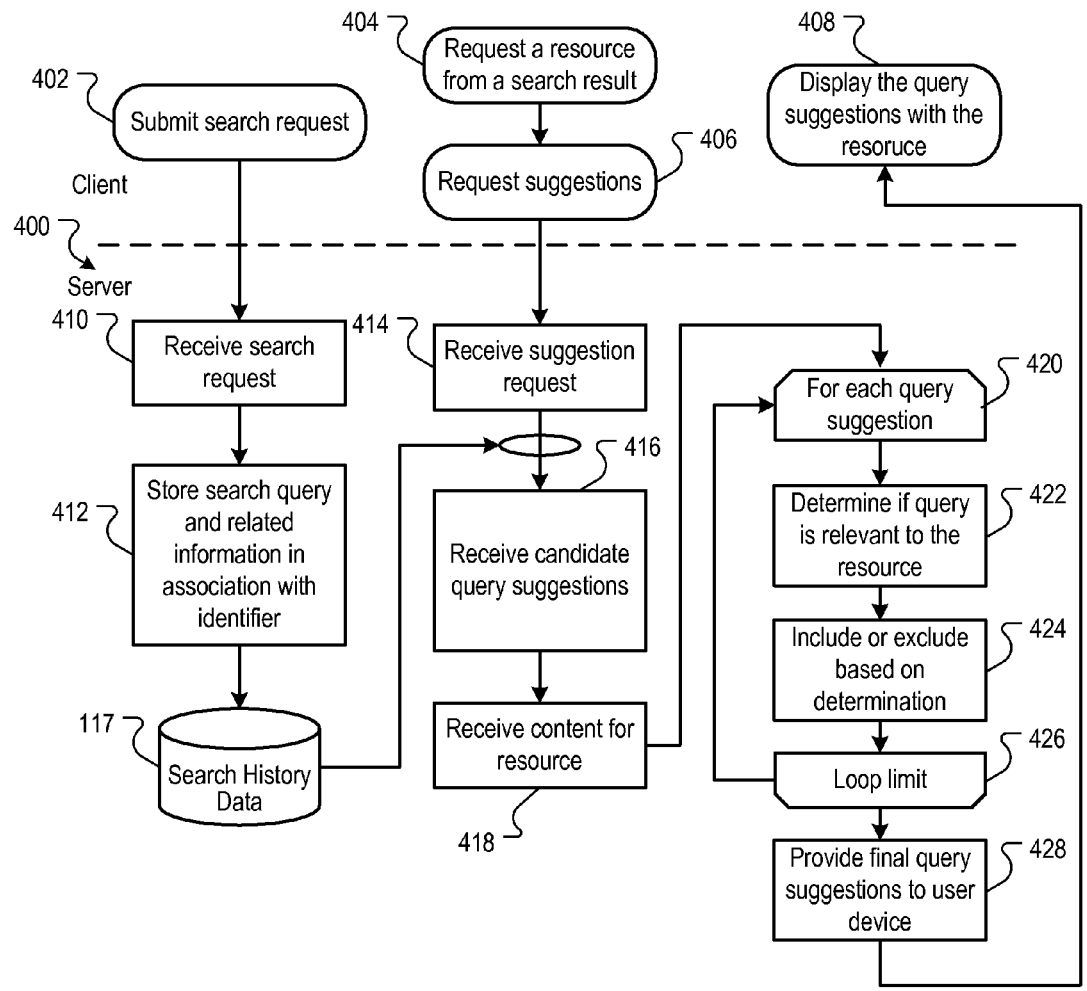
FIG. 3 is a block diagram of a process that provides search query suggestions to a client device.

Processing in the client side implementation is described with respect to FIG. 2, which is a flow diagram of a process 300 that provides search query suggestions at a client, and processing in the server side implementation is described with respect to FIG. 3, which is a flow diagram of a process 400 that provides search query suggestions from a server.

Turning now to FIG. 2, the process 300 begins with the client device submitting a search request to a search engine (302). The search results page that includes search results is received from the search engine and processed (304). The processing can include rendering the search results page on the client device, and, optionally, extracting data from the search results page for inclusion in the search history data 202, as described above.

The process 300 collects the search query and related information 306, and stores the search query and related information in the search history data (310). By doing so, the process 300 builds search history data 202 at the client device that includes data from and related to previous search requests.

The process 300 may optionally retrieve related information from the search engine server (308). Examples of such related information may include the popularity of the search query (e.g., number of searches normalized over a time period), and the like.

The user device, in response to a user input, requests a resource from a search result (312). For example, a user may select a search result on the search results page and the user device receives the content of the page in response. Also in response, the process 300 receives candidate query suggestions (314). In some implementations, the receiving can involve receiving a set of unfiltered query suggestions from the search engine, and then the process 300 applies the search history data to the query suggestions at the client device to generate the candidate set of query suggestions. In other implementation, the all of the query suggestions can be generated at the client device, based solely on the search history data 202.

The process 300 then processes each query suggestion (316). The process 300 determines if the query is relevant to the resource (318). In some implementations, the process 300 determines whether the search query suggestion meets a relevancy criterion that defines the search query suggestion as being relevant to the content of the resource, and includes or excludes the query in a final set of search results based on the determination (320). For example, in response to determining that the search query suggestion meets the relevancy criterion, the process 300 includes the search query suggestion in a final set of search query suggestions. Conversely, in response to determining that the search query suggestion does not meet the relevancy criterion, the process 300 excludes the search query suggestion from the final set of search query suggestions.

In some implementations, the process 300 determines whether the search query suggestion meets a relevancy criterion by calculating a relevance score that measures a relevance of the search query to the content of the resources. The process 300 then determines that the search query suggestion meets the relevancy criterion when the relevance score exceeds the relevance threshold, and otherwise determines that the search query suggestion does not meet the relevancy criterion when the relevance score does not exceed the relevance threshold.

In other implementations, the process 300 determines whether the search query suggestion meets a relevancy criterion by calculating a relevance score that measures a relevance of the search query to the content of the resource, and ranking the search query in an order according to the relevance score of the search query and the relevance score of the other search queries in the candidate set of search queries. The process determines that the search query suggestion meets the relevancy criterion when the search query is one of N (e.g., N=4) highest ranked search queries, and otherwise determines that the search query suggestion does not meet the relevancy criterion when the search query is not one of N highest ranked search queries.

Other ways of determining whether the suggested query is relevant to the content of the resource can also be used. For example, the topics to which the search queries belong can be compared to topics that have been identified for the content of the resources, and the search queries that belong to topics to which the content of the resource also belong can be selected. Once a loop limit is met (322), the process 300 shows the final set of query suggestions to the user (324).

The process 300, by being implemented in the client device, provides added privacy security for users, as the search history data 202 of the user can be stored locally. Often users do not desire to provide or allow the search engine 110 to track their history. Accordingly, implementing the process 300 in the client device allows the users to enjoy the benefits of query suggestions that are both relevant to the user's history and content of a requested and displayed resource while addressing privacy concerns.

Turning now to FIG. 3, a similar process 400 is implemented on the server side. The search engine can also provide query suggestions that are both relevant to the user's history while also protecting the user's privacy. For example, the search history data 117 can be anonymized for privacy protection, so that the data 117, if compromised, cannot be associated with a particular user or user identifier. Various anonymization processes, such as hashing, encryption and obfuscation techniques, can be used to ensure that subject privacy is protected.

A client device submits a search request to the search engine (402), and the process 400 begins with the receipt of the search request at the server (410). The search request includes the user identifier, and the process 400 stores the search query included in the search request and related information in association with the user identifier (412) in the search history data 117. The search engine 110 provides search results to the user in response to the search request. When the user selects a search result, the user device requests a resource from the search result (404), and the user device also requests suggestions from the search engine (406).

The process receives the suggestion request (414) and candidate query suggestions (416). As described above, the candidate query suggestions are query suggestions that are based, in part, on the search history data 117 associated with the search request. The process also receives content for the resource (418), and then processes each query suggestion (420). The process 400 determines if the query is relevant to the resource (422). In some implementations, the process 400 determines whether the search query suggestion meets a relevancy criterion that defines the search query suggestion as being relevant to the content of the resource, and includes or excludes the query in a final set of search results based on the determination (424). For example, in response to determining that the search query suggestion meets the relevancy criterion, the process 400 includes the search query suggestion in a final set of search query suggestions. Conversely, in response to determining that the search query suggestion does not meet the relevancy criterion, the process 400 excludes the search query suggestion from the final set of search query suggestions. The determinations can be done in a manner similar to the determinations done on the client device described above.

Once a loop limit is met (426), the process 400 proves the final set of query suggestions to the user device (428). The user device, in response to receiving the final set of query suggestions, displays the query suggestions with the resource.

Figure 4:
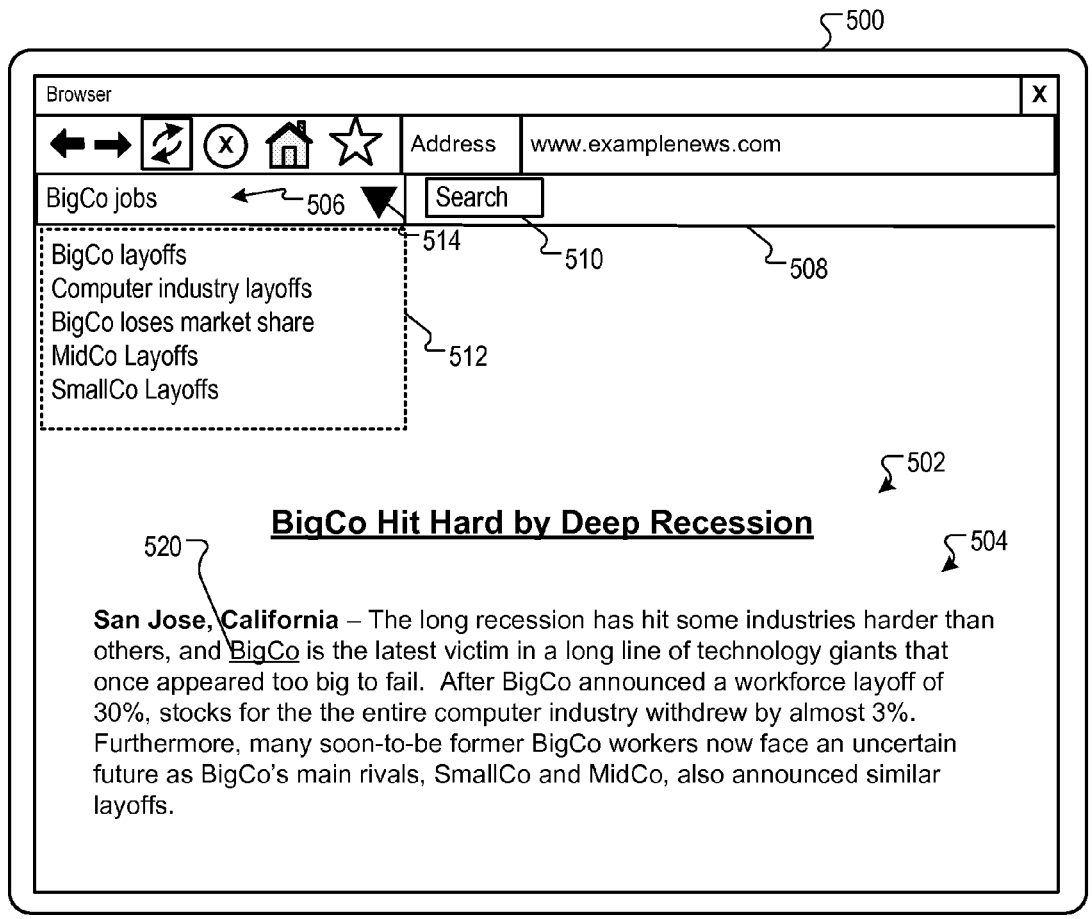
FIG. 4 depicts an example web page displaying search query suggestions for a document based on user history.

FIG. 4 depicts an example web page 500 displaying search query suggestions for a document based on user history. The web page 500 can be provided by use of either the client side implementation or server side implementation described above.

The web page 500 includes the heading 502 "BigCo Hit Hard by Deep recession." The web page 500 also includes text content 504 of a news report. Assume that the user of the user device on which the web page is displayed has been search for articles related to the effects of the recession on the job market in the computer industry. For example, the user may have previously submitted queries such as "computer industry recession," "computer industry layoffs," etc. The query 306 "BigCo jobs", shown a toolbar 308 search input box, was most recently submitted by the user, and the user selected a search result that resulting in the resource at www.example-news.com being sent to the client device.

Query suggestions 512 that are based on the document and the user's search history are shown in response to the user selecting the drop down expansion icon 514. The user can mouse over a query to select the suggested query, and then select the search button 510 to submit a search request that includes the selected search query. Query suggestions 512 can also be presented in a different manner, such as in a list form in a banner at the bottom of the page 500, in a separate frame on the page, etc.

It is desirable to be able to provide query suggestions based on the content of a page as a user navigates away from a search results page. However, as user interests may change as the user navigates to different resources, it is also desirable to stop evaluating the query suggestions for a search query when the content of resources is dissimilar to the resources that were referenced by the search results.

Figure 5:
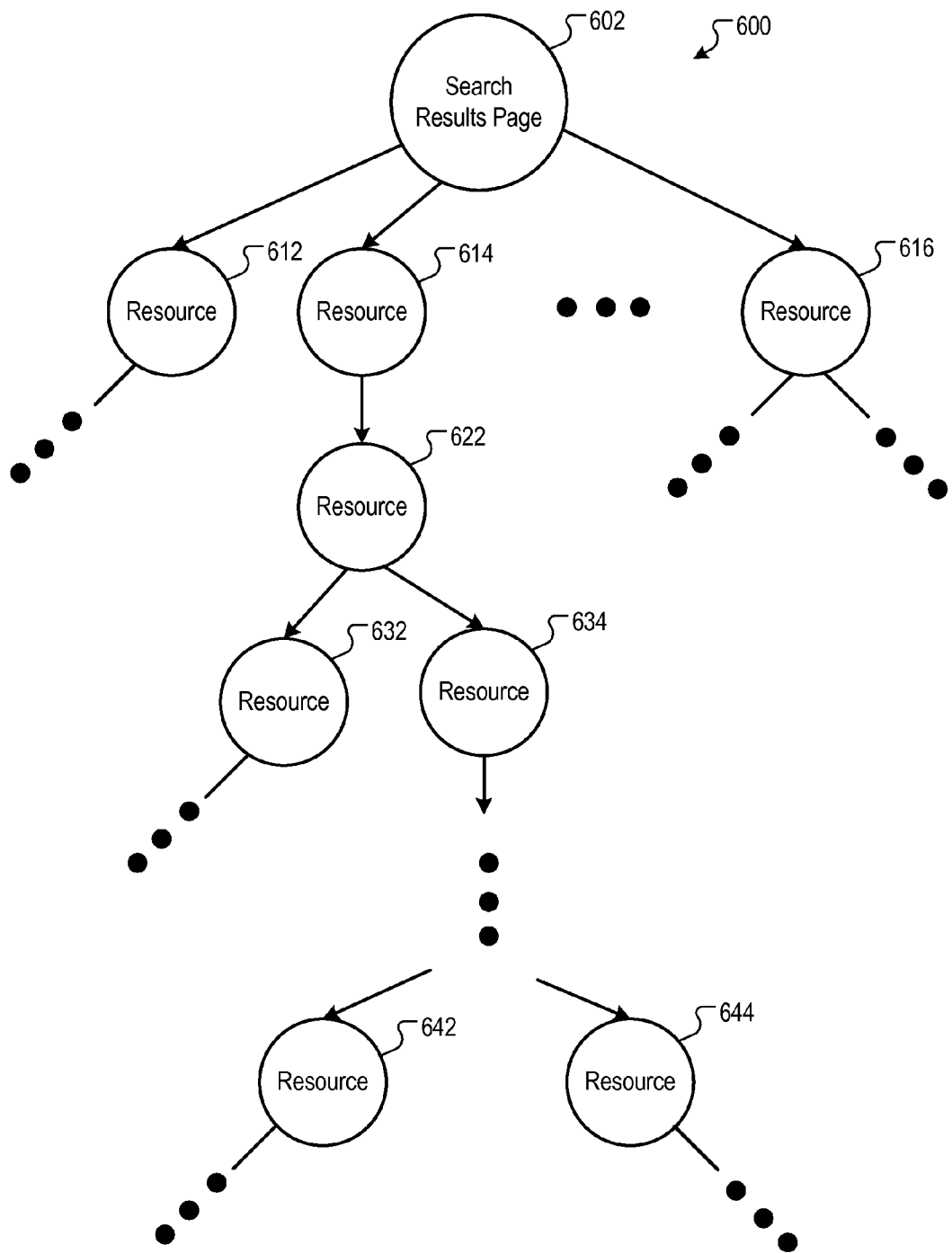
FIG. 5 is a block diagram of a link graph representing links from a search results page node to resource nodes, and links from the resource nodes to other resource nodes.

This concept is illustrated with respect to FIG. 5, which is a block diagram of a link graph 600 representing links from a search results page node 602 to resource nodes 612, 614 and 616, and links from the resource nodes 612, 614 and 616 to other resource nodes.

Assume that the web page 500 is represented by the node 614. Assume that when researching the effects of a recession on the company BigCo, the user selects the link 520 to the homepage of BigCo, which is represented by node 622. The user may then navigate to several other pages within BigCo, e.g., a resource represented by node 634, and subsequent resources, one of which describes a wireless data backup device that BigCo recently released. Assume the user is also searching for a wireless data backup device to purchase. The user may then navigate to a review page from a third party. The review page is represented by the node 644. The review page provides a review of many data backup devices from different vendors, and the content of the review page is entirely unrelated to the effects of the recent recession on BigCo, jobs at BigCo, or the effects of the recession on the computer industry in general. Thus, the queries "BigCo jobs," "BigCo job fair," "SmallCo jobs," "BigCo layoffs", etc., would be of little interest to the user when reading the review page.

Accordingly, in some implementations, the query suggestions are evaluated against the content of a resource only when the resource meets an evaluation relevance threshold. The evaluation relevance threshold is a threshold that is used to determine whether a particular resource is likely to be of similar content to the content of a search results page or content of a resource referenced by a search result on the search results page. The evaluation threshold can be based on a distance of a particular resource from a search results page or distance of a particular resource referenced by a search result on a search results page. Alternatively or in addition, the evaluation threshold can also be based on a similarity of content a resource to the content of a search results page or content of a resource referenced by a search result on the search results page.

For example, the evaluation threshold can be a distance that is equal to or less than N nodes (i.e., subsequent links) from a search results page. In some implementations, N can be set to one of 5, 10 or 15 nodes. The search engine 110 or the query term suggestion system 200 can count the nodes as the user selects resource links. Assuming N is 5, if the resource represented by the node 644 is greater than five nodes from the search results page (or, alternatively, 5 nodes from the resource represented by the node 614), then query suggestions are not evaluated against the content of the resource represented by the node 644. In some implementation, suggestions are also not evaluated against the content of a resource when the resource is provided in response to a user manually entering into a browser a URL of the resource (e.g., by typing in the URL or selecting a bookmark).

Alternatively or in addition, the content of the resource of a selected search result can be represented by a vector of non-stop word terms. For example, the search engine 110 or the query term suggestion system 200 can represent the content of the resource represented by the node 614 as a vocabulary term vector in which each vector term represents a non-stop word in the vocabulary. The weight of each vector term is proportional to the number of times the term occurs in the content of the resource. For each subsequently selected resource, the search engine 110 or the query term suggestion system 200 represents the content of the subsequently selected resource by another vocabulary term vector, and evaluates the similarity of the subsequently selected resource to the content of the resource represented by the node 614 by generating a similarity measurement using the respective vocabulary term vectors (e.g., by generating a cosine similarity score using the respective vocabulary term vectors). If the similarity meets a minimum similarity threshold, then query suggestions are evaluated against the subsequently selected page. Conversely, if the similarity meets a minimum similarity threshold, then query suggestions are not evaluated against the subsequently selected page, nor are they evaluated against any subsequently selected pages.

In addition defining a maximum distance, the evaluation threshold can also define a minimum distance. For example, the evaluation threshold can require that the resource be at least one node from a search results page, i.e., a resource that is provided in response to selecting a link in a resource reference by a and provided in response to selecting a search result. For example, the resources that are selected in response to the user selecting a search result may often have similar terms, as the search system has determined that these resources are relevant to a particular query. Accordingly, in some implementations, query suggestions are not evaluated against the content of the resources that are displayed directly in response to selecting a search result. For these resources (e.g., resources corresponding to nodes 612, 614 and 616), the query suggestions are not filtered, and are displayed as suggestions. For example, query suggestions can be selected from the candidate set of query suggestions independent of the content of the resources that are displayed in response to selecting a search result that identifies the resource as being relevant to the query. These selected query suggestions are then provided for displaying as search results with the resource. In these implementations, the query suggestions are only evaluated against the content of resources that are subsequently selected from a resource referenced by a search result. For example, with respect to FIG. 5, this implementation only evaluates query suggestions against the content of the resources represented by the nodes for which nodes 612, 614 and 616 are ancestors (i.e., nodes 622 and lower).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer implemented method performed by a data processing apparatus, comprising:
receiving, in response to a selection of a search result referencing a first webpage resource, content of the first webpage resource, wherein the first webpage resource is determined to be responsive to a search query included in a search request, the search query being one or more terms that are submitted to a search engine as input to a search operation, the search request being associated with a unique identifier of a user device that provided the search request, and the search result is provided in response to the search request;
receiving a candidate set of search query suggestions for the search query, each search query suggestion in the candidate set being one or more terms that may be submitted to a search engine as input to a search operation, the candidate set of search query suggestions based, in part, on search history data associated with the unique identifier, the search history data including data from and related to previous search requests associated with the unique identifier;
for each of the search query suggestions in the candidate set of search query suggestions:
determining whether the search query suggestion meets a relevancy criterion that defines the search query suggestion as being relevant to the content of the first resource, the determining comprising calculating a relevance score that measures a relevance of the search query suggestion to the content of the first resource displayed on the user device;

in response to determining that the search query suggestion meets the relevancy criterion, including the search query suggestion in a final set of search query suggestions; and in response to determining that the search query suggestion does not meet the relevancy criterion, excluding the search query suggestion from the final set of search query suggestions; and providing the final set of search query suggestions for display on the user device.

2. The method of claim 1, wherein determining whether the search query suggestion meets a relevancy criterion that defines the search query suggestion as being relevant to the content of the first resource comprises:

determining that the search query suggestion meets the relevancy criterion when the relevance score exceeds the relevance threshold; and determining that the search query suggestion does not meet the relevancy criterion when the relevance score does not exceed the relevance threshold.

3. The method of claim 1, further comprising:

receiving search results, each search result referencing a resource and including a snippet of text extracted from the resource;

processing the search results to extract data to store in the search history data; and storing the extracted data in the search history data.

4. The method of claim 3, wherein processing the search results to extract data to store in the search history data comprises extracting domain names from the search results.

5. The method of claim 3, wherein processing the search results to extract data to store in the search history data comprises extracting non-stop word text from the snippets.

6. The method of claim 1, wherein the search history data includes search queries from search requests that are previous to the search request that includes the search query, and further comprising storing the search request in the search history data.

7. The method of claim 1, wherein:

receiving the content of the first resource that is determined to be responsive to a search query included in a search request comprises receiving the first resource at the user device in response to selecting a search result that references the first resource and that was provided by a search engine in response to the search request;

the search history data associated with the unique identifier is search history data stored at the user device; and determining whether the search query suggestion meets a relevancy criterion comprises determining at the user device whether the search query suggestion meets the relevancy criterion.

8. The method of claim 1, wherein:

receiving the content of the first resource that is determined to be responsive to a search query included in a search request comprises receiving the content of the first resource at a search engine;

the search history data associated with the unique identifier is search history data stored at the search engine; and determining whether the search query suggestion meets a relevancy criterion comprises determining at the search engine whether the search query suggestion meets the relevancy criterion.

9. The method of claim 1, further comprising:

receiving content of a subsequent resource for which the first resource is an ancestor in a link graph representing the subsequent resource and first resource as nodes;

determining that the content of the subsequent resource meets an evaluation relevance threshold and in response to the determination, for each of the search query suggestions in the candidate set of search query suggestions:

determining whether the search query suggestion meets a relevancy criterion that defines the search query suggestion as being relevant to the content of the subsequent resource;

in response to determining that the search query suggestion meets the relevancy criterion, including the search query suggestion in a subsequent final set of search query suggestions; and in response to determining that the search query suggestion does not meet the relevancy criterion, excluding the search query suggestion from the subsequent final set of search query suggestions; and providing the subsequent final set of search query suggestions for display on the user device.

10. A computer implemented method performed by a data processing apparatus, comprising:

receiving content of a first resource that is determined to be responsive to a search query included in a search request, the search request being associated with a unique identifier of a user device that provided the search request;

receiving a candidate set of search query suggestions for the search query, the candidate set of search query suggestions based, in part, on search history data associated with the unique identifier, the search history data including data from and related to previous search requests associated with the unique identifier;

for each of the search query suggestions in the candidate set of search query suggestions:

determining whether the search query suggestion meets a relevancy criterion that defines the search query suggestion as being relevant to the content of the first resource;

in response to determining that the search query suggestion meets the relevancy criterion, including the search query suggestion in a final set of search query suggestions; and in response to determining that the search query suggestion does not meet the relevancy criterion, excluding the search query suggestion from the final set of search query suggestions;

providing the final set of search query suggestions for display on the user device;

receiving content of a subsequent resource for which the first resource is an ancestor in a link graph representing the subsequent resource and first resource as nodes;

determining that the content of the subsequent resource meets an evaluation relevance threshold and in response to the determination, for each of the search query suggestions in the candidate set of search query suggestions:

determining whether the search query suggestion meets a relevancy criterion that defines the search query suggestion as being relevant to the content of the subsequent resource;

in response to determining that the search query suggestion meets the relevancy criterion, including the search query suggestion in a subsequent final set of search query suggestions; and in response to determining that the search query suggestion does not meet the relevancy criterion, excluding the search query suggestion from the subsequent final set of search query suggestions; and providing the subsequent final set of search query suggestions for display on the user device;
wherein determining that the content of the subsequent resource meets an evaluation relevance threshold comprises determining that subsequent resource is within N subsequent links to the first resource, wherein N is at least 1.

11. A computer implemented method performed by a data processing apparatus, comprising:
receiving content of a first resource that is determined to be responsive to a search query included in a search request, the search request being associated with a unique identifier of a user device that provided the search request;
receiving a candidate set of search query suggestions for the search query, the candidate set of search query suggestions based, in part, on search history data associated with the unique identifier, the search history data including data from and related to previous search requests associated with the unique identifier;
for each of the search query suggestions in the candidate set of search query suggestions:
 determining whether the search query suggestion meets a relevancy criterion that defines the search query suggestion as being relevant to the content of the first resource;
 in response to determining that the search query suggestion meets the relevancy criterion, including the search query suggestion in a final set of search query suggestions; and
 in response to determining that the search query suggestion does not meet the relevancy criterion, excluding the search query suggestion from the final set of search query suggestions;
providing the final set of search query suggestions for display on the user device;
receiving content of a subsequent resource for which the first resource is an ancestor in a link graph representing the subsequent resource and first resource as nodes;
determining that the content of the subsequent resource meets an evaluation relevance threshold and in response to the determination, for each of the search query suggestions in the candidate set of search query suggestions:
 determining whether the search query suggestion meets a relevancy criterion that defines the search query suggestion as being relevant to the content of the subsequent resource;
 in response to determining that the search query suggestion meets the relevancy criterion, including the search query suggestion in a subsequent final set of search query suggestions; and
 in response to determining that the search query suggestion does not meet the relevancy criterion, excluding the search query suggestion from the subsequent final set of search query suggestions; and
 providing the subsequent final set of search query suggestions for display on the user device;
wherein determining that the content of the subsequent resource meets an evaluation relevance threshold comprises determining that a cosine similarity score generated from a vector representation of the content of the subsequent resource and a vector representation of the content of the first resource exceeds a minimum cosine similarity score.

12. A computer-implemented method performed by a data processing apparatus, comprising:
receiving content of a resource;
receiving a candidate set of search query suggestions for a search query included in a search request, the search request being associated with a unique identifier of a user device the proved the search request, the candidate set of search query suggestions based, in part, on search history data associated with the unique identifier, the search history data including data from previous search requests associated with the unique identifier;
in response to determining that the resource is a resource provided in response to a selection of a search result that identifies the resource as being responsive to the query, then selecting search query suggestions from the candidate set of search query suggestions and including the selected search query suggestions in a final set of search query suggestions, the selection being independent of the content of the resource; and
in response to determining that the resource is a resource that is selected from within N subsequent link selections of a resource provided in response to a selection of a search result that identifies the resource as being responsive to the search query, wherein N is at least 1, then for each of the search query suggestions in the candidate set of search query suggestions:
 determining whether the search query suggestion meets a relevancy criterion that defines the search query suggestion as being relevant to the content of the resource;
 in response to determining that the search query suggestion meets the relevancy criterion, including the search query suggestion in a final set of search query suggestions; and
 in response to determining that the search query suggestion does not meet the relevancy criterion, excluding the search query suggestion from the final set of search query suggestions; and
providing the final set of search query suggestions for display on the user device.

13. A system, comprising:
a data processing apparatus; and
a computer storage medium encoded with a computer program, the program comprising instructions that when executed by the data processing apparatus cause the data processing apparatus to perform operations comprising:
 receiving, in response to a selection of a search result referencing a first webpage resource, content of the first webpage resource, wherein the first webpage resource is determined to be responsive to a search query included in a search request, the search query being one or more terms that are submitted to a search engine as input to a search operation, the search request being associated with a unique identifier of a user device that provided the search request, and the search result is provided in response to the search request;
 receiving a candidate set of search query suggestions for the search query, each search query suggestion in the candidate set being one or more terms that may be submitted to a search engine as input to a search operation, the candidate set of search query suggestions based, in part, on search history data associated with the unique identifier, the search history data including data from and related to previous search requests associated with the unique identifier;
 for each of the search query suggestions in the candidate set of search query suggestions:
  determining whether the search query suggestion meets a relevancy criterion that defines the search query suggestion as being relevant to the content of the resource, the determining comprising calculating a relevance score that measures a relevance of the search query suggestion to the content of the first resource displayed on the user device;

in response to determining that the search query suggestion meets the relevancy criterion, including the search query suggestion in a final set of search query suggestions; and in response to determining that the search query suggestion does not meet the relevancy criterion, excluding the search query suggestion from the final set of search query suggestions; and providing the final set of search query suggestions for display on the user device.

14. A system, comprising:

a data processing apparatus; and a computer storage medium encoded with a computer program, the program comprising instructions that when executed by data processing apparatus cause the data processing apparatus to perform operations comprising:

receiving content of a resource;

receiving a candidate set of search query suggestions for a search query included in a search request, the search request being associated with a unique identifier of a user device the proved the search request, the candidate set of search query suggestions based, in part, on search history data associated with the unique identifier, the search history data including data from previous search requests associated with the unique identifier;

in response to determining that the resource is a resource provided in response to a selection of a search result that identifies the resource as being responsive to the query, then selecting search query suggestions from the candidate set of search query suggestions and including the selected search query suggestions in a final set of search query suggestions, the selection being independent of the content of the resource; and in response to determining that the resource is a resource that is selected from within N subsequent link selections of a resource provided in response to a selection of a search result that identifies the resource as being responsive to the search query, wherein N is at least 1, then for each of the search query suggestions in the candidate set of search query suggestions:

determining whether the search query suggestion meets a relevancy criterion that defines the search query suggestion as being relevant to the content of the resource;

in response to determining that the search query suggestion meets the relevancy criterion, including the search query suggestion in a final set of search query suggestions; and in response to determining that the search query suggestion does not meet the relevancy criterion, excluding the search query suggestion from the final set of search query suggestions; and providing the final set of search query suggestions for display on the user device.

* * * * *